United States Patent
Skinner

(10) Patent No.: US 7,610,807 B2
(45) Date of Patent: Nov. 3, 2009

(54) LEVEL GAGE

(75) Inventor: Jeffrey M. Skinner, Houston, TX (US)

(73) Assignee: Jogler, Inc., Houston, TX (US)

( * ) Notice: Subject to any disclaimer, the term of this patent is extended or adjusted under 35 U.S.C. 154(b) by 207 days.

(21) Appl. No.: 11/590,108

(22) Filed: Oct. 31, 2006

(65) Prior Publication Data

US 2008/0098810 A1    May 1, 2008

(51) Int. Cl.
*G01F 23/56* (2006.01)
*G01F 23/02* (2006.01)
*G01F 23/28* (2006.01)

(52) U.S. Cl. .................. 73/319; 73/290 V; 73/323

(58) Field of Classification Search ............... 73/54.11, 73/54.23, 319, 323, 290 V
See application file for complete search history.

(56) References Cited

U.S. PATENT DOCUMENTS

| | | | |
|---|---|---|---|
| 2,685,797 A * | 8/1954 | Morschel ............... 73/319 |
| 4,158,964 A * | 6/1979 | McCrea et al. ............ 73/290 V |
| 4,475,290 A | 10/1984 | Colditz |
| 5,136,884 A * | 8/1992 | Lovett ............... 73/313 |
| 5,196,791 A | 3/1993 | Dumais |
| 5,274,328 A * | 12/1993 | Begin et al. ............ 324/207.12 |
| 5,412,316 A | 5/1995 | Dumais et al. |
| 5,473,245 A * | 12/1995 | Silvus et al. ........... 324/207.13 |
| 5,723,870 A * | 3/1998 | Crowne et al. ............... 250/577 |
| 5,848,549 A | 12/1998 | Nyce et al. |
| 5,986,449 A | 11/1999 | Koski |
| 5,998,991 A | 12/1999 | Begin |
| 6,018,247 A | 1/2000 | Kelly |
| 6,253,611 B1 | 7/2001 | Varga et al. |
| 6,289,728 B1 | 9/2001 | Wilkins |
| 6,356,071 B1 | 3/2002 | Koski et al. |
| 6,418,787 B1 | 7/2002 | Eck |
| 6,508,118 B1 | 1/2003 | Eck |
| 6,802,218 B2 | 10/2004 | Patel |
| 6,813,946 B1 | 11/2004 | Benton |
| 2005/0241391 A1 | 11/2005 | Kull |

OTHER PUBLICATIONS

TEMPERATURES.COM; "About Thermowells"; http:www.temperatures.com/twells.html; Apr. 9, 2007.
Babbitt; "LTM-300"; http://www.iprocessmart.com/Babbitt/II_ltm100.htm; Nov. 10, 2005.
Babbitt International; "High Resolution Magnetostrictive Level Transmitters"; http://www.babbittlevel.com/ltm100htm; Nov. 10, 2005.

* cited by examiner

*Primary Examiner*—John Fitzgerald
(74) *Attorney, Agent, or Firm*—John R Casperson

(57) ABSTRACT

A wave guide probe for use with direct-read tank level gages to provide electric signal output is disclosed. The apparatus comprises a translucent tube, a wave guide probe, and an electronics assembly. The translucent tube is for containing a fluid interface. The wave guide probe is positioned in the translucent tube. The electronics assembly is operably associated with the wave guide probe for actuating the wave guide probe and producing an electrical output signal representative of a location of the fluid interface in the translucent tube. The apparatus provides both electronic and optical level indications and is well suited for tank applications.

7 Claims, 4 Drawing Sheets

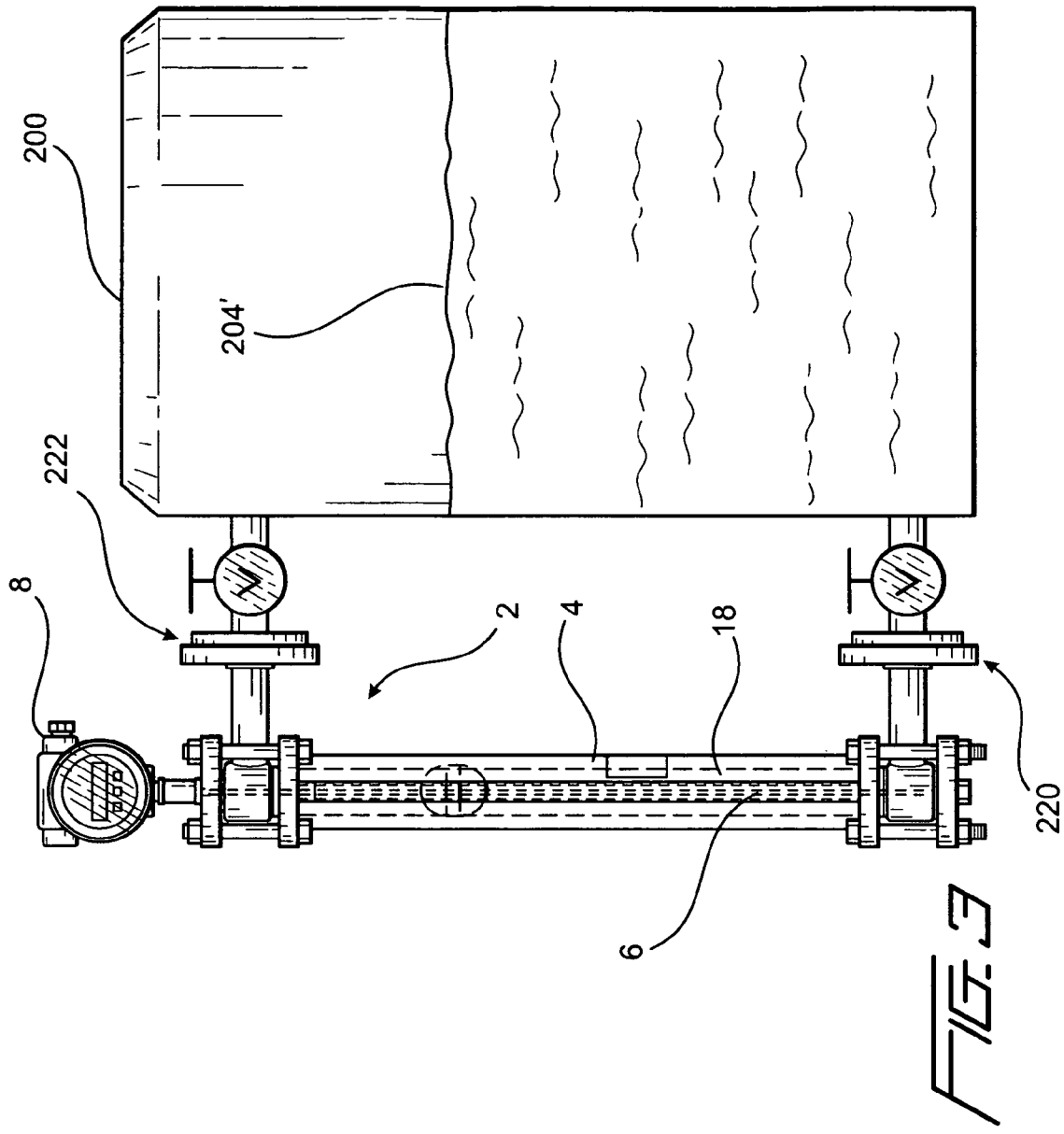
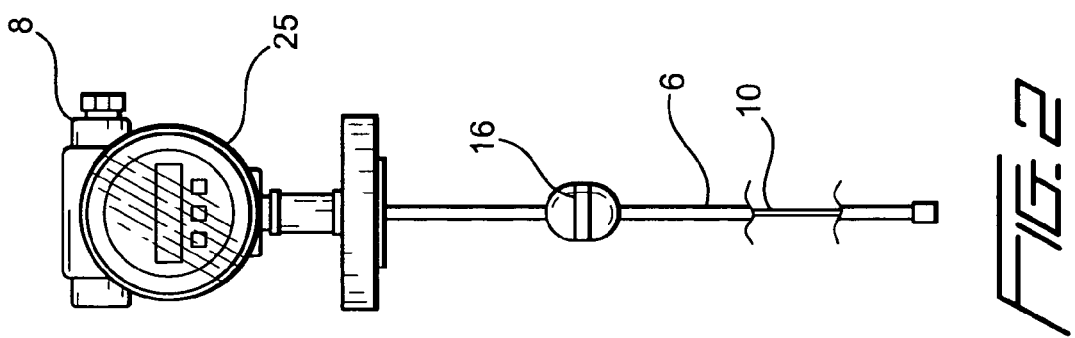

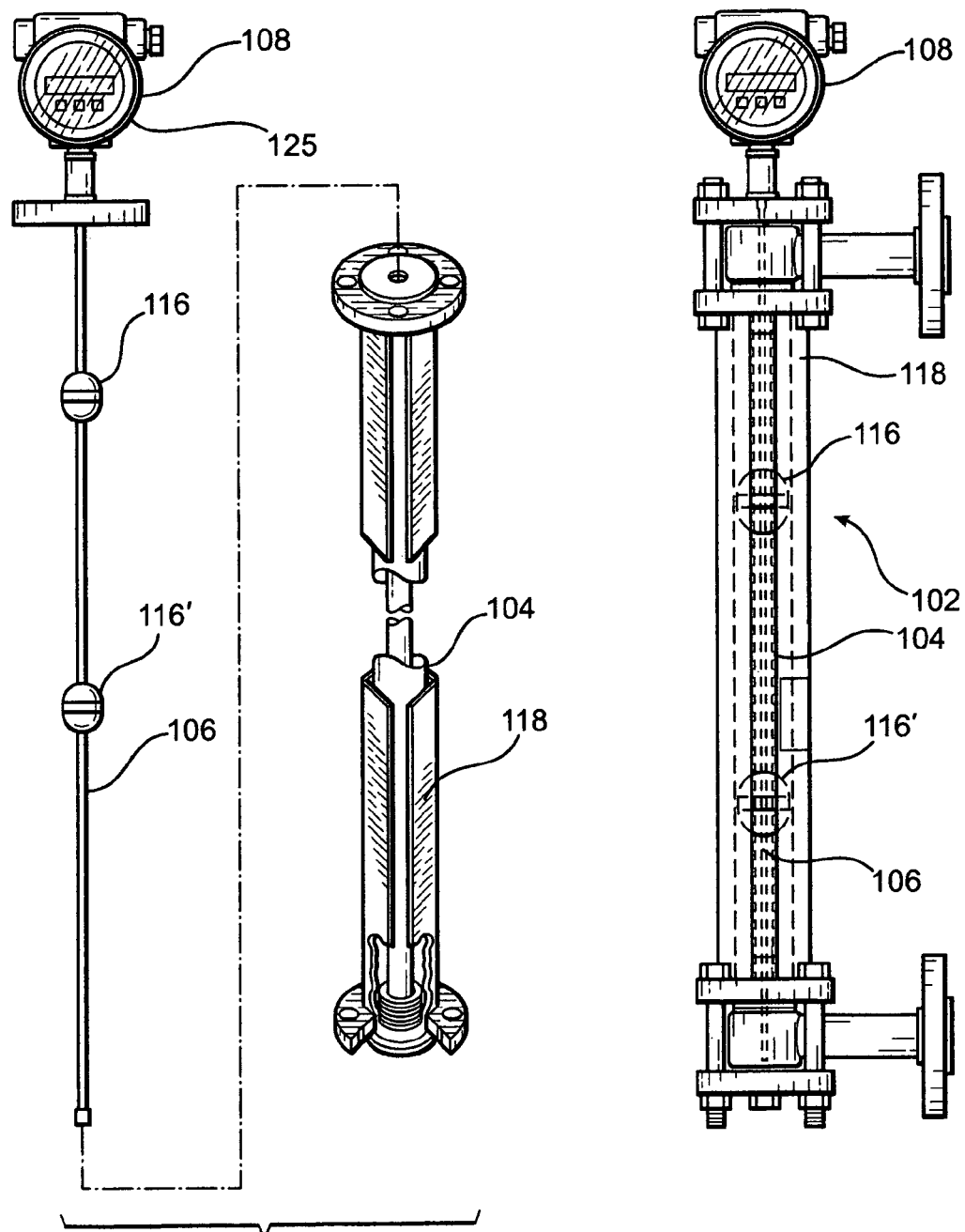

LEVEL GAGE

FIELD OF THE INVENTION

In certain aspects, this invention relates to improved level gages. In other aspects, this invention relates to methods for improving level gages.

BACKGROUND OF THE INVENTION

Level gages are used to determine liquid level in opaque tankage. The simplest and most reliable type is a liquid sight monitor, also known as a direct reading level gage, or sight glass. It comprises a vertical translucent tube, generally constructed of glass or plastic, positioned outside of the tank and connected to the tank so that the liquid level in the tube is the same as the liquid level in the tank. An operator can determine the liquid level in the tank simply by viewing the liquid level in the tube. Direct reading tubular level gages are commonly employed on tanks having a working pressure of less than about 300 psig.

Other types of level gages for tanks generally rely on electronics and/or a float for operability. An advantage of an electronic gage is that the level reading can be near instantaneously transmitted to a remote location for a continuous level readout. The electronic level signal can be used in automated process control. A potential drawback to the use of these types of gages is failure. Electronics and floats can both fail, making it extremely difficult to accurately determine the liquid level in the tank. It is also inherently difficult to verify that the signal produced by these types of gages is indeed representative of liquid level in the tank.

Redundant systems are known. However, there exists need for providing redundancy in an increased cost-effective manner, and for cost effectively retrofitting existing sight glass systems to provide an electrical signal output for remote monitoring and automated control.

OBJECTS OF THE INVENTION

It is an object of this invention to provide a redundant system for monitoring liquid level in tankage.

It is another object of this invention to provide an electronic signal representative of the liquid level in a tank for transmission to a remote location.

It is a further object of this invention to provide a cost-effective technique for retrofitting an existing sight glass system for an electronic output representative of liquid level.

SUMMARY OF THE INVENTION

In one embodiment of the invention, there is provided an apparatus comprising a translucent tube, a wave guide probe, and an electronics assembly. The translucent tube is for containing a fluid interface. The wave guide probe is positioned in the translucent tube. The electronics assembly is operably associated with the wave guide probe for actuating the wave guide probe and producing an electrical output signal representative of a location of the fluid interface in the translucent tube. The apparatus is redundant and it is easy to calibrate the electronic signal to yield values representative of the position of the fluid interface.

In another embodiment of the invention, there is provided a method for providing a tank having a sight glass level gage mounted on its side with an electrical output signal representative of a fluid level in the tank. The tank is provided with a sight glass level gage of the type comprising a generally vertically positioned translucent tube having an upper end and a lower end. A lower flow path means connects a lower end of the tube with an interior of the tank. An upper flow path means connects an upper end of the tube with the interior of the tank. The connections and the translucent tube are positioned so that a fluid interface in the translucent tube is representative of a fluid level in the tank. The method is carried out by positioning a wave guide probe in the translucent tube, and providing an electronics assembly operably associated with the wave guide probe for actuating the wave guide probe and producing an electrical output signal representative of a location of the fluid interface in the translucent tube.

The method provides a simple and inexpensive way to convert direct level reading systems into electronic systems that can be monitored at a remote location, while at the same time preserving the direct read feature which permits errors to be detected.

BRIEF DESCRIPTION OF THE DRAWINGS

FIG. 2 is a frontal view of a probe according to an embodiment of the invention that can be installed in a prior art system as shown in FIG. 1 to provide electrical output signals.

FIG. 3 is a side view, partly in schematic, showing the probe of FIG. 2 installed in the equipment of FIG. 1.

FIG. 4 is an exploded view of another embodiment of the invention.

FIG. 5 is a side view of a level gage and transmitter assembly containing the invention shown in FIG. 4.

DETAILED DESCRIPTION OF THE INVENTION

Figure 1:
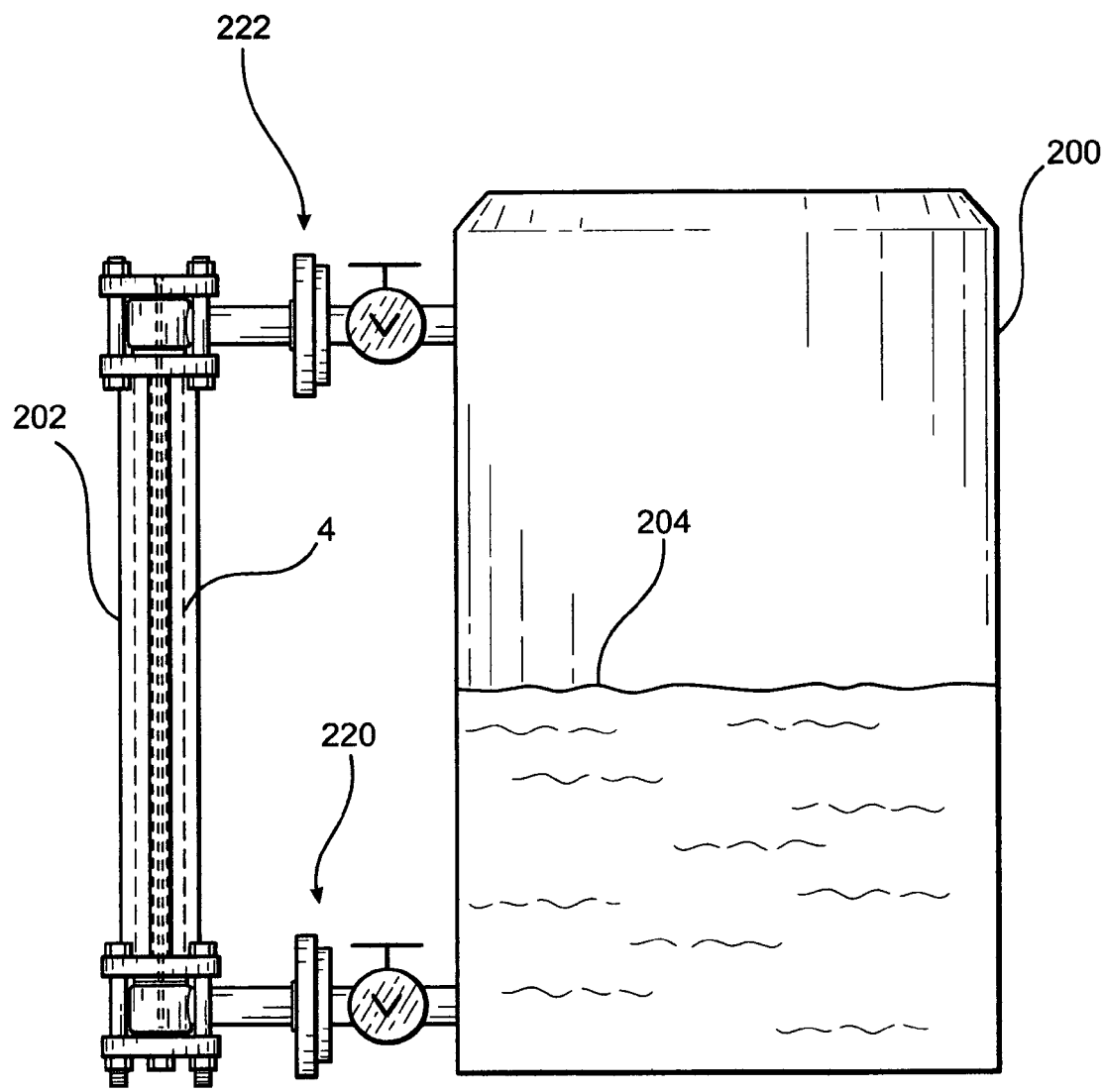
FIG. 1 is a side view, partly in schematic, showing a direct reading level gage according to the prior art.

In one embodiment of the invention, there is provided an apparatus 2, 102 comprising a translucent tube 4, 104, a wave guide probe 6, 106, and an electronics assembly 8, 108. The translucent tube is for containing a fluid interface. The wave guide probe is positioned in the translucent tube. The electronics assembly is operably associated with the wave guide probe for actuating the wave guide probe and producing an electrical output signal representative of a location of the fluid interface in the translucent tube. The apparatus is redundant and it is easy to calibrate the electronic signal to yield values representative of the position of the fluid interface.

The translucent tube can be the same in size as employed in prior art direct-reading apparatus. See FIG. 1. Generally speaking, the translucent tube has an inside diameter in the range of from about 0.5 inches to about 4 inches, and a length in the range of from about 1 to about 50 feet. Usually, the translucent tube has an inside diameter in the range of from about 0.75 inches to about 1.25 inches and a length in the range of from about 5 feet to about 25 feet. The wave guide probe according to the invention is sized to fit in the translucent tube. Generally, the wave guide probe has an outside diameter in the range of from about 0.1 to about 0.5 inches.

In one embodiment, the wave guide probe comprises a nonmagnetic outer tube and a magnetostrictive wire 10 axially positioned in the outer tube. A magnetic annularly shaped fluid-interface-seeking float 16 rides the outer surface of the nonmagnetic outer tube so as to be in the annulus between the nonmagnetic outer tube and the translucent tube when the apparatus is in use. If desired, however, a radar-principled device could be used.

If desired, a plurality of magnetic annularly-shaped fluid-interface-seeking floats can ride the tube to enable the detection of multiple interfaces. For example, in FIGS. 4 and 5, a float 116 can be provided with an apparent density to seek an upper interface, for example, gas/oil, and a float 116' can be provided with a greater apparent density so that it seeks a lower interface, for example, oil/water. In the illustrated embodiments, the translucent tube is also partially surrounded by an optional protective shield 18, 118.

The electronics assembly comprises a housing 25, 125, an electric pulse generator 322, and a torsion sensor 302. The housing is positioned on an upper end of the wave guide probe. The electric pulse generator is positioned in the housing for transmitting an electric pulse through the magnetostrictive wire 10. The torsion sensor is positioned in the housing for sensing a torsional strain induced in the magnetostrictive wire by the magnet in response to the electric pulse and producing an electrical output signal representative of a position of the magnetic annularly-shaped fluid-interface-seeking float.

Figures 6, 7:
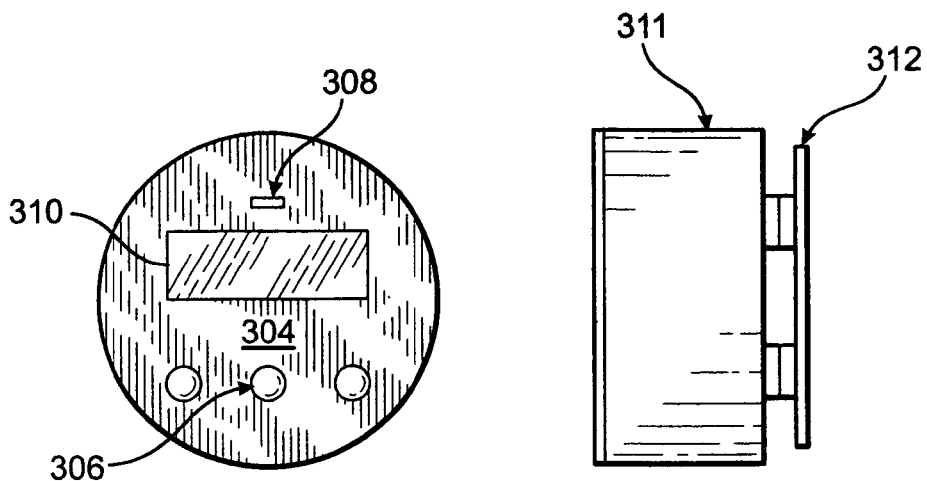
FIG. 6 shows a front view of an electronic hardware assembly which can be used in an embodiment of the invention.
FIG. 7 is a side view of the electronic hardware assembly shown in FIG. 6.

FIG. 6 shows a front view of the electronic hardware assembly. The front face carries pushbuttons 306 for operator input and configuration and a diagnostic connector 308 for allowing access to internal electrical signals. A display 310 is provided for local display functions.

FIG. 7 is a side view of electronic hardware assembly. Electronic module 311 contains the elements shown in FIG. 9. A wiring/filter printed circuit board 312 is mounted aft for providing interconnection between the Electronic Module and the Sensor Assembly shown in FIG. 8 as well as for connection with field wiring.

Figure 8:
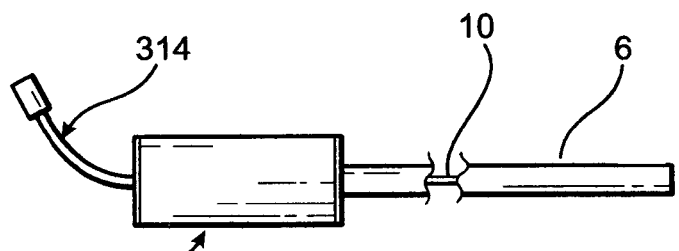
FIG. 8 shows schematically shows a Sensor Assembly which can be used in an embodiment of the invention.

FIG. 8 shows the Sensor Assembly in schematic form. The torsion sensor 302 has the probe 6 extending from one end, and a wiring harness 314 extends from the other end for connection to the circuit board. In practice, a brief current pulse is applied to the wire 10. A torsional disturbance is created when a suitable magnetic field is present near the wire. The torsional disturbance subsequently propagates through the wire at a constant velocity. A mode conversion device located at the end of the sensor assembly converts the torsional disturbance into an electrical signal which is passed to the electronic module for processing.

Figure 9:
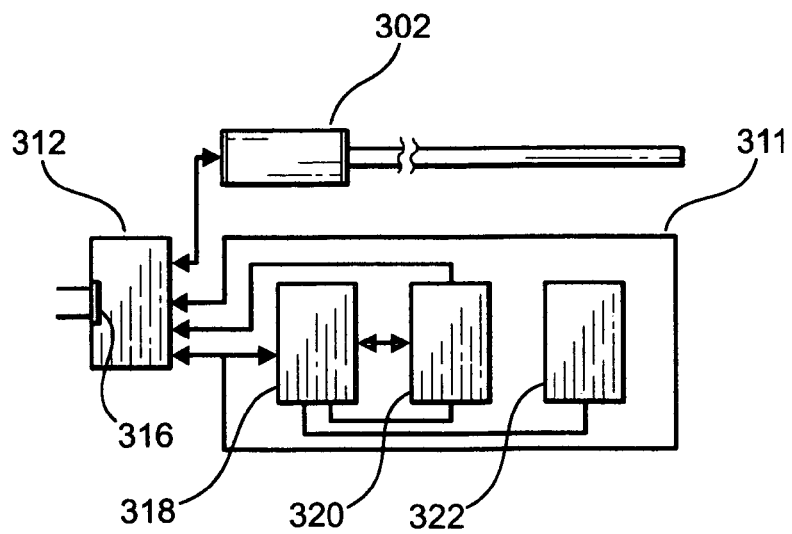
FIG. 9 shows as a block diagram a system of preferred electronic components which can be used in an embodiment of the invention.

FIG. 9 is a block diagram of preferred electronic components. Power is provided to the circuit board at connector 316. The electronics module contains a microprocessor PCB assembly 318, a magnetostrictive PCB assembly 320, and a user interface, all operatively connected with circuitry.

In another embodiment of the invention, there is provided a method for providing a tank, such as a prior art tank 200 in FIG. 1, having a sight glass level gage 202 mounted on its side with an electrical output signal representative of a fluid level 204 in the tank. The sight glass level gage is of the type comprising a generally vertically positioned translucent tube 4 having an upper end and a lower end. A lower flow path means 220 connects a lower end of the tube with an interior of the tank. An upper flow path means 222 connects an upper end of the tube with the interior of the tank. The upper flow path means, the lower flow path means, and the translucent tube are positioned so that a fluid interface in the translucent tube is representative of a fluid level in the tank. The method is carried out by positioning the wave guide probe 8 in the translucent tube, and providing an electronics assembly operably associated with the wave guide probe for actuating the wave guide probe and producing an electrical output signal representative of a location of the fluid interface in the translucent tube. The improved device with the added functionality can be as shown in FIG. 3.

Because the method is for adapting a prior art device for electrical signal output at minimal expense, the translucent tube from the device being improved is preferably not replaced. Generally speaking, the translucent tube has an inside diameter in the range of from about 0.75 inches to about 2.00 inches and a length in the range of from about 1 foot to about 25 feet. The wave guide probe has an outside diameter in the range of from about 0.25 to about 0.50 inches and is sized to fit the tube.

Although a radar wave guide probe can be used, a magnetostrictive probe may be preferred. In the magnetostrictive probe embodiment, the wave guide probe comprises a nonmagnetic outer tube with a magnetostrictive wire axially positioned in the outer tube. It is positioned in the translucent tube so as to form an annulus between the nonmagnetic tube and the translucent tube. A magnetic annularly shaped fluid-interface-seeking float is positioned in the annulus between the nonmagnetic outer tube and the translucent tube.

For use, an electric pulse is transmitted through the magnetostrictive wire. Passage of the pulse by the magnet induces a torsional strain wave which travels back up the wire. The torsional strain induced in the magnetostrictive wire by the magnet in response to the electric pulse is sensed. An electrical output signal representative of a position of the magnetic annularly shaped fluid-interface-seeking float is then produced for transmission, such as by wire, radio wave, or light wave, to a remote monitoring and/or control location.

While certain preferred embodiments of the invention have been described herein, the invention is not to be construed as being so limited, except to the extent that such limitations are found in the claims.

What is claimed is:

1. Apparatus comprising
a translucent tube for containing a fluid interface,
a wave guide probe positioned in the translucent tube, and
an electronics assembly operably associated with the wave guide probe for actuating the wave guide probe and producing an electrical output signal representative of a location of the fluid interface in the translucent tube,
wherein
the wave guide probe comprises
a nonmagnetic outer tube, and
a magnetostrictive wire axially positioned in the outer tube,
said apparatus further comprising
a magnetic annularly shaped fluid-interface-seeking float riding on the nonmagnetic outer tube and positioned in the annulus between the nonmagnetic outer tube and the translucent tube.

2. Apparatus as in claim 1 wherein the electronics assembly comprises
a housing positioned on an upper end of the wave guide probe,
an electric pulse generator positioned in the housing for transmitting an electric pulse through the magnetostrictive wire,
a torsion sensor positioned in the housing for sensing a torsional strain induced in the magnetostrictive wire by the magnet in response to the electric pulse and producing an electrical output signal representative of a position of the magnetic annularly shaped fluid-interface-seeking float, said apparatus further comprising a second magnetic annularly shaped fluid-interface-seeking float positioned in the annulus between the nonmagnetic outer tube and the translucent tube.

3. Apparatus as in claim 1 wherein
the translucent tube has an inside diameter in the range of from about 0.5 inches to about 4 inches, and a length in the range of from about 1 to about 50 feet.

4. Apparatus as in claim 3 wherein
the translucent tube has an inside diameter in the range of from about 0.75 inches to about 2.00 inches and a length in the range of from about 1 foot to about 25 feet, and
the wave guide probe has an outside diameter in the range of from about 0.25 to about 0.5 inches.

5. A method
for providing a tank having a sight glass level gage with an electrical output signal representative of a fluid level in said tank said method comprising
providing a tank having a sight glass level gage mounted on a side of said tank,
said sight glass level gage comprising a generally vertically positioned translucent tube having an upper end and a lower end, a lower flow path means connecting a lower end of the tube with an interior of the tank, and an upper flow path means connecting an upper end of the tube with the interior of the tank, said upper flow path means and said lower flow path means and said translucent tube being positioned so that a fluid interface in the translucent tube is representative of a fluid level in said tank, said method comprising positioning a wave guide probe in the translucent tube, and
providing an electronics assembly operably associated with the wave guide probe for actuating the wave guide probe and producing an electrical output signal representative of a location of the fluid interface in the translucent tube,
wherein
the wave guide probe comprises a nonmagnetic outer tube and
a magnetostrictive wire axially positioned in the outer tube,
an annulus being formed between the wave guide probe and the translucent tube,
said method further comprising
positioning a magnetic annularly shaped fluid-interface-seeking float in the annulus between the nonmagnetic outer tube and the translucent tube.

6. A method as in claim 5 wherein
the translucent tube has an inside diameter in the range of from about 0.75 inches to about 2.00 inches and a length in the range of from about 1 foot to about 25 feet, and
the wave guide probe has an outside diameter in the range of from about 0.25 to about 0.5 inches.

7. A method as in claim 5 further comprising
transmitting an electric pulse through the magnetostrictive wire,
sensing a torsional strain induced in the magnetostrictive wire by the magnet in response to the electric pulse, and
producing an electrical output signal representative of a position of the magnetic annularly shaped fluid-interface-seeking float.

* * * * *